June 17, 1924.  1,497,831

J. AUBERSCHEK

WATER FILTER

Filed Dec. 20, 1921

Inventor:
Joseph Auberschek,
by Young & Young
Attorneys.

Patented June 17, 1924.

1,497,831

UNITED STATES PATENT OFFICE.

JOSEPH AUBERSCHEK, OF MILWAUKEE, WISCONSIN.

WATER FILTER.

Application filed December 20, 1921. Serial No. 523,664.

*To all whom it may concern:*

Be it known that I, JOSEPH AUBERSCHEK, a citizen of the United States, and resident of Milwaukee, in the county of Milwaukee and State of Wisconsin, have invented certain new and useful Improvements in Water Filters; and I do hereby declare that the following is a full, clear, and exact description thereof.

The invention relates to a filter and more especially one which may be automatically cleaned by reversing the direction of the current therethru.

An important feature is the provision of means whereby sediment which is strained out by the filter when the current is flowing in its normal direction or reversed and may be readily drawn off so as to render the drinking water which passes thru the exit pipe perfectly pure.

Another object is the provision of a construction which is readily adapted to be thoroughly cleaned.

An additional object is the provision of means especially adapted on the reversal of the current to clean the filter.

This structure provides for the protecting of filtering discs from the crust that forms upon the surface of the sand in the filter.

Other objects and advantages appear as the description proceeds. Reference is had to the accompanying drawing, in which:—

Figures 1, 2:
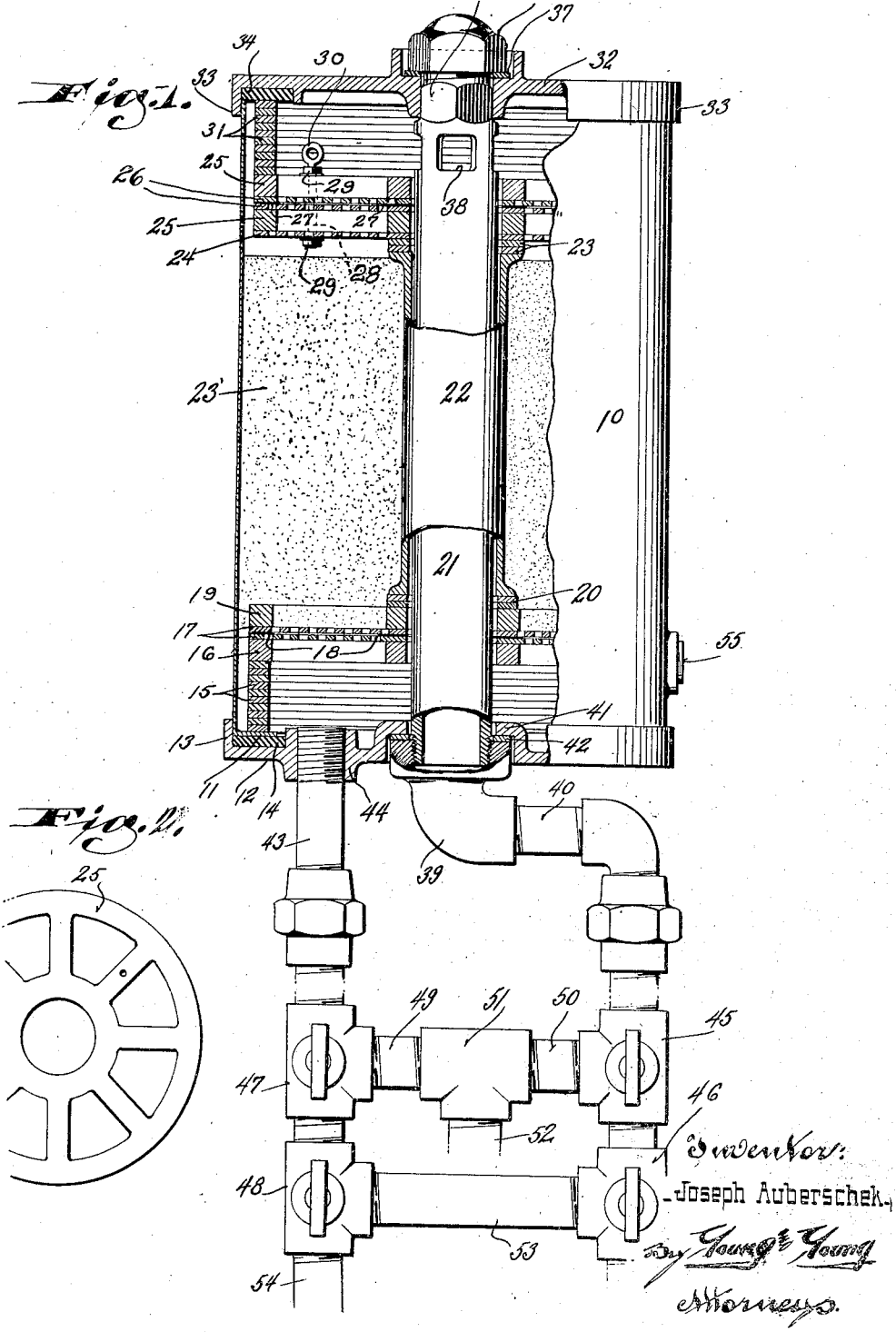
Figure 1 is a central cross section of the invention.
Figure 2 is a detail of a spider drawn on a similar scale.

Cylinder 10 is provided with an inwardly directed flange 11. Head 12 has an upwardly directed flange 13 which envelops the lower end of cylinder 10 and is provided with a gasket 14 contacting with flange 11. A plurality of similar washers 15 rest on flange 11 and are spaced inwardly from cylinder 10. A spider 16 rests on the topmost washer 15 and supports the lower of two apertured discs 17 spaced slightly apart by washers 18 which are exceedingly thin, so that a desired filtering action of the liquid passing thru the aperture results. Spider 19 rests on the upper of discs 17 and supports a plurality of washers 20. Spiders 16 and 19, and discs 17 and washers 20, are spaced from pipe 21. A sleeve 22 envelops pipe 21 and if so desired may be made rigid therewith. Sand 23' fills the major portion of cylinder 10 but does not extend below discs 17. Sleeve 22 supports washers 23 on which a disc 24 is positioned for a purpose which will be presently explained. Similar spiders 25 are spaced apart by apertured disks 26 having washers 27 of great thinness therebetween. The apertures are off-set with respect to each other so as to give the disks a maximum of filtering action. A bolt 28 extends thru apertures in spiders 25, and is provided with nuts 29 for compressing the spiders together, an eye 30 being provided on bolt 28 to facilitate removal of the parts. A plurality of such bolts may be utilized if desired. On the upper spider 25 a plurality of washers 31 may be positioned and they are spaced inwardly from cylinder 10, a cap 32 is provided with a downwardly projecting flange 33 and a gasket 34. Nut 35 is threaded upon and closes the end of pipe 21 exercising a clamping action upon cap 32, thus compressing it against cylinder 10 and washers 31. Pipe 21 has a hexagonal head 36 received in cap 32, a washer 37 being provided to assure a water tight closure. Openings 38 are provided in pipe 21 which is threaded at its lower end to engage with elbow 39 of inlet pipe 40. A wrench may be used on head 36 to effect the engagement. Head 12 is provided with a flange 41 which cooperates with a washer 42 abutting against elbow 39 to form a water tight closure. Outlet pipe 43 is received in threaded engagement in boss 44 integral with head 12. Inlet pipe 40 is provided with two three-way valves 45, and 46, and outlet pipe 43 has two three-way valves 47 and 48. Valve 47 has pipe 49 extending inwardly therefrom and valve 45 has a similar pipe 50. Pipes 49 and 50 are received in a T 51, it being connected to a waste pipe 52. A pipe 53 extends between valve 46 and 48. The operation of the device is as follows:—

Valves 46 and 48 may be turned to direct the water thru pipe 53 and out of pipe 54. When this relationship of parts exists there will be no feeding of water thru the filter in the normal relation of parts. Valves 46 and 45 direct the water thru pipes 40 and 21 and thru openings 38. It then filters among washers 31 and between discs 26 and proceeds down thru sand 23 among discs 17 and 19 and washers 15 thru which it filters and is finally discharged thru pipe 43, valves 47 and 48 permitting the distribution thru pipe 54. When it is desired to clean the filter, valves 46, 47, and 48, are turned and the water is fed upwardly thru pipes 53 and 43 and thru the sand. The spacing of disc 24 above the sand and of washers 31 from cylinder 10 permits a freedom of movement of the sand that is especially advantageous in this reverse operation. The first disc 24 has a buffer action tending to prevent the crust which has formed on the top of the sand from coming in immediate contact with discs 26 and clogging them. The water is then fed in this reverse operation thru pipe 21, valve 45 being turned to permit the outflow of the water to waste pipe 52. A thorough cleansing of the upper part of the filter results from this reverse operation. A certain amount of sediment and impure matter however, is deposited during this process in the bottom of cylinder 10. In order to remove this, water is led thru valves 46 and 45, pipe 21 thru sand 23', and pipe 43 and valve 47 is turned to direct the water thru pipe 49, T 51, and waste pipe 52. In this operation all impurity is removed from the lower part of the filter and when valve 47 is turned again to normal position the water discharged thru pipe 54 is perfectly pure. Cylinder 10 is provided with a tappet 55 by which sand may be removed and new sand put in place. This is an especially advantageous feature for large filters. Obviously the invention illustrated is capable of considerable modification and I do not desire to limit myself to the precise structure illustrated but wish to embrace a substantial range of equivalents within the scope of the appended claims.

I claim as my invention:—

1. The combination of a container member, a cap therefor, a plurality of superimposed washers downwardly extending from said cap, a plurality of discs having disaligned apertures, means spacing said discs apart, a pair of spiders, said discs being interposed between said spiders, a bolt, said spiders and discs being apertured to receive said bolt for holding said spiders and discs together, a head for said containers and means for cooperating with said head and said cap to hold said spiders, discs, and washers, in position.

2. In a filter, a head, a cylinder resting thereon, a plurality of superimposed washers in the bottom of said cylinder, a spider resting on said washers, a plurality of apertured discs, means spacing said discs slightly apart, a spider supported by said discs, a central pipe extending thru said head and said container, means surrounding said pipe and contacting with said last named spider for holding said spider in position, sand in said cylinder, said pipe having openings in the upper end thereof, rigid filtering means surrounding said pipe and interposed between said openings and said sand, a cap resting upon the top of said cylinder and contacting upon the top of said rigid filtering means, and a nut threaded on said pipe and urging said cap downwardly.

3. In a device for filtering water, a reversible filter, an inlet pipe therefor, a three way valve in said pipe, a second three way valve in said pipe interposed between said first mentioned valve and said filter, an outlet pipe leading from said filter, a third three way valve on said outlet pipe, a fourth three way valve on said outlet pipe interposed between said filter and said third valve, a waste pipe, a second pipe for conducting water from said second valve to said waste pipe, a third pipe for conducting water from said fourth valve to said waste pipe, and a fourth pipe leading from said first mentioned valve to said third valve.

In testimony that I claim the foregoing I have hereunto set my hand at Milwaukee, in the county of Milwaukee and State of Wisconsin.

JOSEPH AUBERSCHEK.